March 7, 1950
E. S. RINALDY
2,499,418
OPPOSED CONTACT COMPARATOR, MULTIPLE
SELECTIVE ANVIL TYPE
Filed Aug. 6, 1943
3 Sheets-Sheet 1
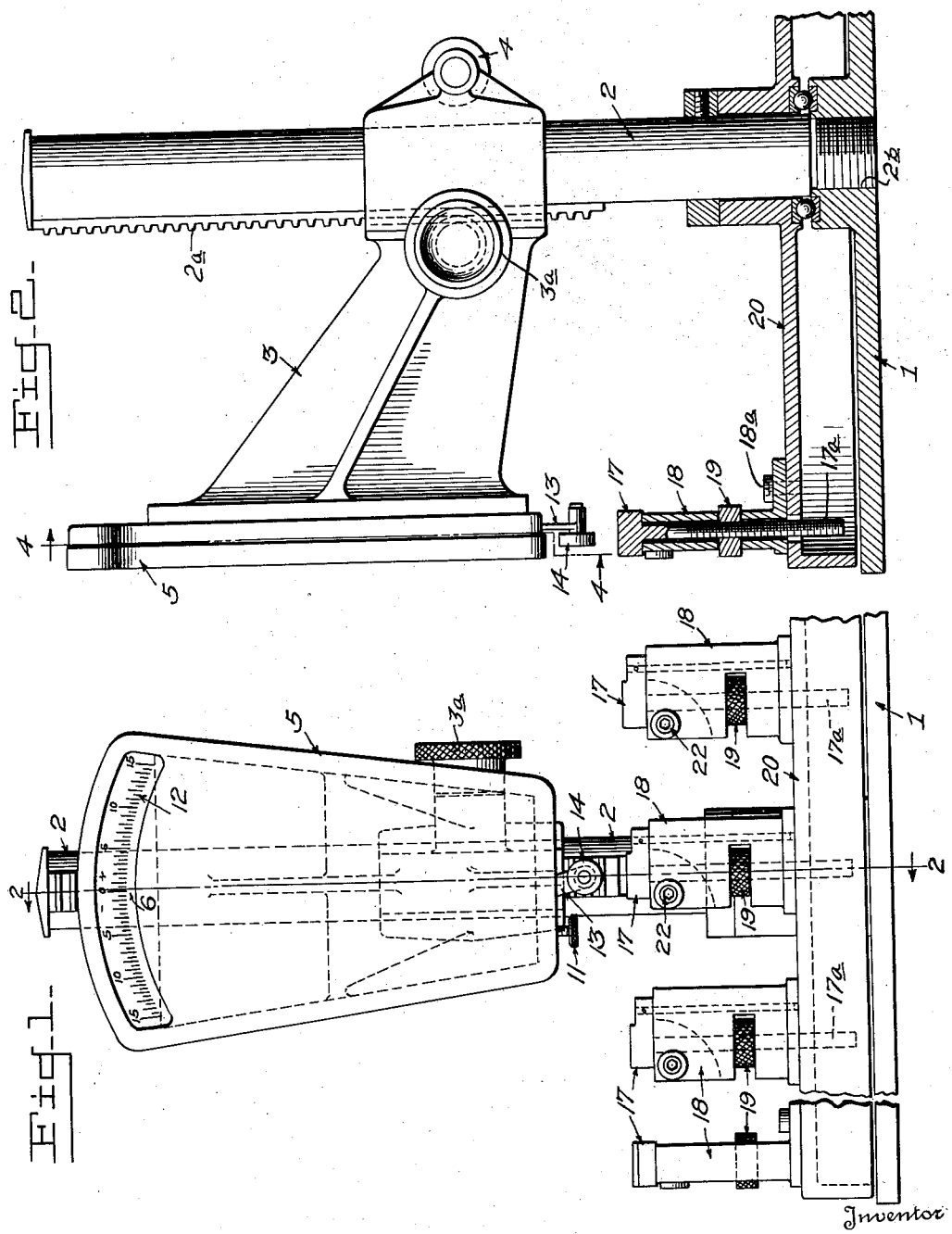
Inventor
EDWARD S. RINALDY, March 7, 1950     E. S. RINALDY     2,499,418
OPPOSED CONTACT COMPARATOR, MULTIPLE
SELECTIVE ANVIL TYPE
Filed Aug. 6, 1943     3 Sheets-Sheet 2
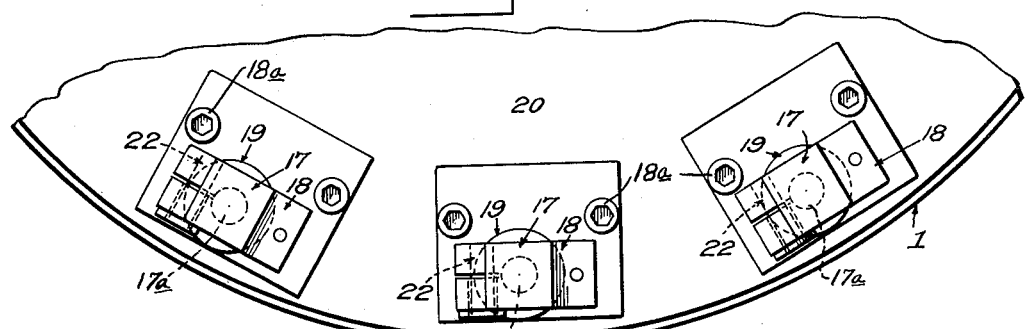
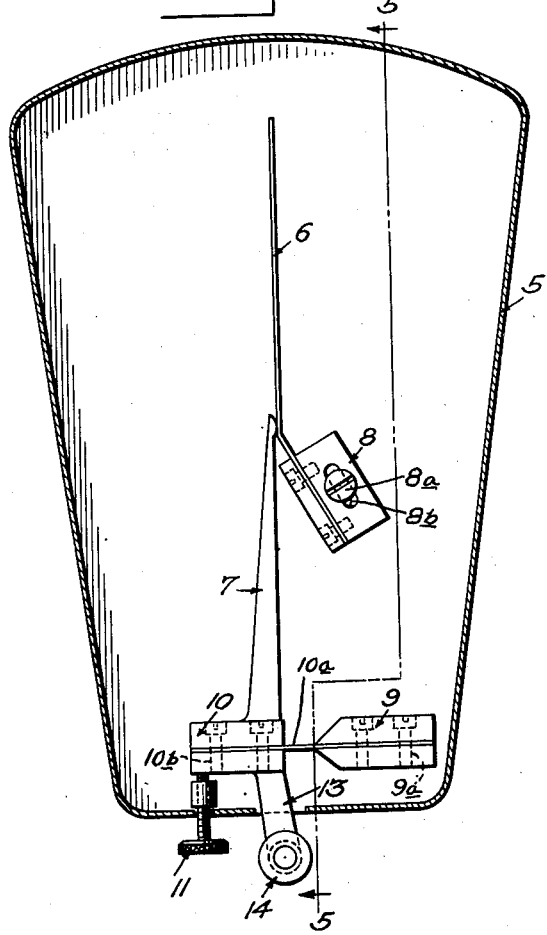
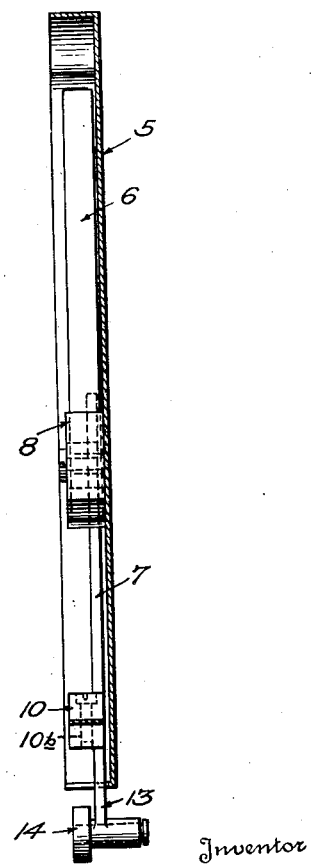
Inventor
EDWARD S. RINALDY,

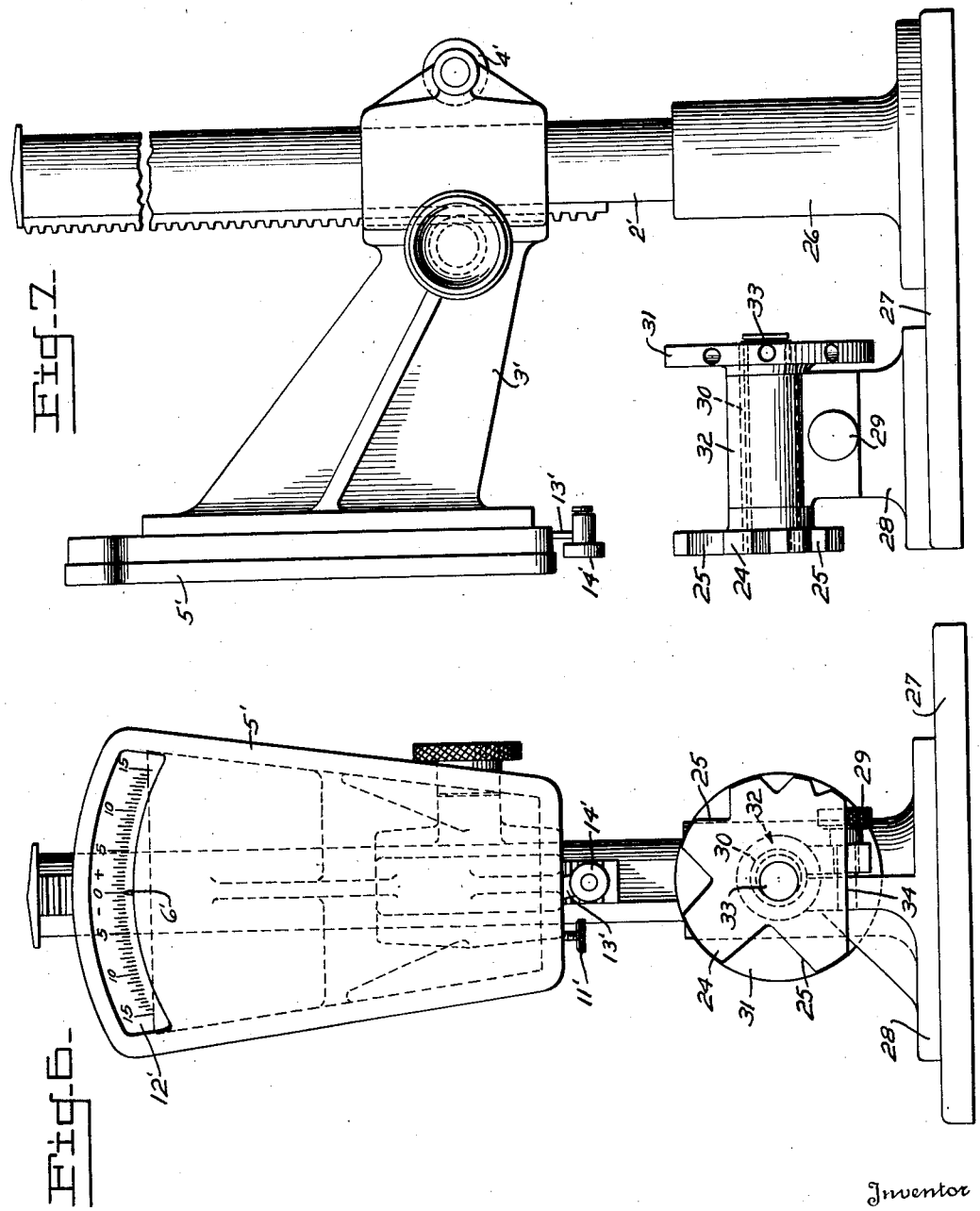

Patented Mar. 7, 1950

2,499,418

UNITED STATES PATENT OFFICE 2,499,418

OPPOSED CONTACT COMPARATOR, MULTIPLE SELECTIVE ANVIL TYPE

Edward S. Rinaldy, Chester, N. J.

Application August 6, 1943, Serial No. 497,611

2 Claims. (Cl. 33—148)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a comparator having particular application in the testing and gauging of components in relationship to a master or pre-determined sized model. In the present practice of gauging components against a pre-determined master model of the said component, each of the components is gauged individually by means of a micrometer or like instrument. In cases where there are thousands of components each of which may have multiple calibrations or comparisons to be made thereon, it is obvious that the multiple steps required to check each of the calibrations will entail a considerable length of time and of effort.

The primary object of the present invention is to provide a device by means of which, components having multiple gauge dimensions can be calibrated in rapid successive stages in a single compact testing device.

Another object of the invention is to provide a dial mechanism of simple design and construction adapted for use in indicating deviations in component parts.

The invention can best be understood from the following description to be read in view of the accompanying drawings in which:

Figure 1 is a front elevation of the preferred embodiment of the invention.

Figure 2 is a vertical sectional view, partly in side elevation, taken substantially along a plane as indicated by line 2—2 of Fig. 1.

Figure 3 is a fragmentary plan view of a portion of the apparatus.

Figure 4 is a sectional view, partly in elevation, on an enlarged scale, taken substantially along a plane as indicated by the line 4—4 of Fig. 2.

Figure 5 is a sectional view on the line 5—5 of Fig. 4.

Figure 6 is a front elevational view of a modified form of the invention; and

Figure 7 is a side elevation of the instrument shown at Fig. 6.

Referring to the drawings, 1 identifies the base of the instrument. A post 2 is attached to the base as by a threaded connection 2b. This post is formed with a longitudinally-extending rack 2a. An indicator supporting arm 3, is formed at one end as a split sleeve surrounding post 2 and adapted to be clamped in adjusted position therealong by a clamping screw 4. The arm may be adjusted along post 2 by a pinion fixed upon a shaft journaled in arm 3, which shaft also carries a knob 3a. The pinion is in mesh with rack 2a.

A frame or casing 5 is fixed to the outer end of arm 3 and carries an indicator means. This indicator means includes a resilient blade or pointer 6 having one end bent as shown and clamped in a block 8, adjustably secured as by means of slot 8b and screw 8a to the rear wall of casing 5. The pointer 6 has a resiliency urging its free end to the left, as viewed in Fig. 4 whereby it abuts at a point closely adjacent its connection with block 8, with the free end of an actuating lever or arm 7. This arm is mounted upon one end of a spring arm 10a, said end being clamped by screws 10b between upper and lower sections of a block 10 and having its other end clamped by screws 9a between upper and lower sections of a block 9, one of said sections such as the upper one, being rigidly attached to casing 5 by means not shown.

The upper and lower sections of block 10 may be integral with arm 7 and an arm or lever 13, respectively. This lever has a work contact on its end, such as roller 14. A screw 11 is threaded into a block fixed to casing 5 and abuts the lower section of block 10 to thereby adjustably limit the counterclockwise movement of arm 7 and pointer 6. When a force is applied to roller 14, lever 13 and arm 7 pivot as a unit because of the resiliency of spring arm 10a, whereby the free end of arm 7 moves pointer 6 clockwise to give an accurate and highly magnified indication over scale 12, of the movement of roller 14, all as will be clear from an inspection of Fig. 4. From Figs. 1 and 3, it will be noted that each block 18 is split longitudinally of its upper portion, that is, the portion above its slot receiving nut 19. A clamping screw 22 operates to draw the two halves together to lock the anvil 17 in its position of vertical adjustment.

The operation of the instrument is briefly described as follows: The master model of the component to be tested is placed upon one of the anvils, and the anvil is elevated, by adjustment of the nut 19, to a position where the component is in contact with the roller 14.

The nut is adjusted until the pointer 6 indicates any desired indication on scale 12, such as zero. The turntable 20 is then rotated to bring another anvil 17 beneath feeler 14 and its nut 19 is adjusted by means of a master gage block to bring pointer 6 to zero for a dimension which may be different from that for the anvil first described. Each of the remaining anvils or lower contacts is similarly adjusted for other dimensions of an object to be gaged.

In Figs. 6 and 7 there is shown a modification of the turntable arrangement of Figs. 1 to 3. In this modification, the indicator per se and its mounting upon the post, are identical with those shown upon Figs. 1 to 5, and parts are identified by the same reference numerals, primed, as have been used to identify corresponding parts in Figs. 1 to 5. Hence detailed description is deemed unnecessary. Post 2' is fixed within a socket 26, in turn secured to a base 27. An abutment support 28 is fixed to base 27 and has an integral split sleeve 32 defining a normally horizontal axis. A screw 29 is adapted to draw the two sides of the split together to clamp in adjusted rotated position, a tubular shaft 30 having an adjusting disk 31 fixed on its inner end projecting from sleeve 32. As clearly shown at Fig. 6, the inner cylindrical surface of shaft 30, is eccentric of its outer surface. A shaft 33 has a snug fit within shaft 30 and an anvil or abutment disk 24 is fixed on a forwardly-projecting end of shaft 33.

As shown, disk 24 is provided with V-notches 25 of varying apex distances from the axis of shaft 33. A flat abutment 34 is also provided. The notches afford means for gaging various diameters of objects in the same manner that dimensions are determined in the species of Figs. 1–3. In using the device in the position shown at Fig. 6, for example, a circular gage block of the desired dimension is positioned in the uppermost notch to engage roller 14'. Thereupon, disk 31 is turned to adjust disk 24 toward or from casing 5' until pointer 6' is at the desired indication on scale 12'. Screw 29 is then turned down to clamp sleeve 30. The distance of the apex of each notch from the axis of shaft 33 may be varied to suit the various dimensions to be gaged so that it is necessary merely to turn disk 24 to bring the several notches into gaging position to complete a series of measurements.

It is preferred in the operation of the device that the indicating needle reading be set at a minus tolerance, and this is accomplished in the species of Figs. 1–3 by adjustment with the screw 11. The components to be tested are thereafter placed upon the anvil, and the component is gently pushed beneath the roller 14. Any deviation in tolerance or size of the component will move the roller 14 to position pointer 6 on scale 12 or 12' in a different location from its initially calibrated position.

In one preferred embodiment of the invention, the distance from the roller 14 to its point of support is .250 inch and the distance from the said point of support along the arm 7 is 2.50 inches, the travel is therefore multiplied ten times. This ratio recurs where arm 7 impinges on the needle 6 so that the needle will give a reading of .10 which will represent a movement of .001 inch of roller 14.

It is to be understood that the anvils upon which the components are placed may be of any desired shape or contour, or may be flat, curved, or grooved, as the need may arise.

There may also be provided any number of anvils upon any one turn-table, and the anvils will be attached to the turn-table at the most advantageous position for use.

The gage per se, as disclosed in present Figures 4 and 5, is claimed in my divisional application, Serial Number 129,994, filed November 29, 1949.

I claim:

1. A gage of the opposed contact type comprising a base, a post fixed in said base, a turntable journaled on said post for rotation about said post as an axis, an arm vertically adjustable on said post and adapted to be clamped thereto, a contact gage fixed on said arm and having a work contact radially offset from said axis, a plurality of work anvils, means mounting each anvil on said turntable in circumferentially spaced relation about said axis each at the same radius from the axis of the post as the work contact of said gage and for individual adjustment parallel to said axis, each said anvil being consecutively movable by rotation of said turntable into cooperative juxtaposed relation with said work contact.

2. A testing apparatus comprising a base, a standard secured thereto, and extending upwardly from the base, a bracket projecting outwardly from the standard, a visual indicator supported by the bracket and including a housing provided with a disk face containing graduations, a needle mounted in said housing and having a free end disposed for movement in front of the face, a lever mounted in the housing and having one end projecting therefrom, the opposite end of the lever bearing against the needle, a work engaging member mounted on the apparatus adjacent the outwardly projecting end of the lever and between which and said outwardly extending end of the lever a piece of work to be gauged is positioned for moving said lever relatively to the housing to actuate the indicating needle, said work engaging member comprising a turntable rotatably mounted on the standard and disposed in a plane substantially at a right angle to the plane of said lever, a plurality of anvil members projecting upwardly from said turntable, said anvil members being circumferentially spaced from each other.

EDWARD S. RINALDY.

REFERENCES CITED

The following references are of record in the file of this patent:

UNITED STATES PATENTS

| Number | Name | Date |
| --- | --- | --- |
| 165,158 | Dennison | July 6, 1875 |
| 499,199 | Bath | June 13, 1893 |
| 882,897 | Larava | Mar. 24, 1908 |
| 914,855 | Mastrangel | Mar. 9, 1909 |
| 1,426,207 | McDuff | Aug. 15, 1922 |
| 1,702,455 | Trumpler | Feb. 19, 1929 |
| 2,083,759 | Temple | June 15, 1937 |
| 2,159,335 | Marwick | May 23, 1939 |
| 2,208,635 | Johnson | July 23, 1940 |
| 2,305,731 | Palmgren | Dec. 22, 1942 |

FOREIGN PATENTS

| Number | Country | Date |
| --- | --- | --- |
| 326,470 | Germany | Sept. 27, 1920 |
| 345,897 | Germany | Dec. 22, 1921 |
| 369,503 | Germany | Feb. 20, 1923 |